US006646191B1

(12) United States Patent
Martin

(10) Patent No.: US 6,646,191 B1
(45) Date of Patent: Nov. 11, 2003

(54) TENSION TOP GUITAR

(76) Inventor: E. Cleason Martin, 17 Grieble Rd., Myerstown, PA (US) 17067

(*) Notice: Subject to any disclaimer, the term of this patent is extended or adjusted under 35 U.S.C. 154(b) by 0 days.

(21) Appl. No.: 10/047,371

(22) Filed: Jan. 14, 2002

(51) Int. Cl.[7] .................................................. G01D 3/00
(52) U.S. Cl. ......................................................... 84/291
(58) Field of Search .......................... 84/291, 293, 267, 84/290

(56) References Cited

U.S. PATENT DOCUMENTS

| | | | | |
|---|---|---|---|---|
| 653,521 A | | 7/1900 | Montoya | |
| 3,974,730 A | | 8/1976 | Adams, Jr. | |
| 4,169,402 A | | 10/1979 | Wood | |
| 4,793,233 A | | 12/1988 | Olthoff | |
| 5,025,695 A | * | 6/1991 | Viel | 84/293 |
| 5,052,269 A | | 10/1991 | Young, Jr. | |
| 5,058,479 A | | 10/1991 | Shaw | |
| 5,305,675 A | * | 4/1994 | Lasner | 84/313 |
| 5,469,770 A | | 11/1995 | Taylor | |
| 5,661,252 A | | 8/1997 | Krawczak | |
| 5,739,444 A | | 4/1998 | Borisoff | |
| 5,804,746 A | | 9/1998 | Kersenbrock et al. | |
| 5,895,872 A | | 4/1999 | Chase | |
| 6,040,510 A | | 3/2000 | Yaun | |
| 6,051,764 A | | 4/2000 | Sakurai | |
| 6,166,308 A | | 12/2000 | Lam | |
| 6,169,236 B1 | | 1/2001 | Pilar, Jr. | |
| 6,188,005 B1 | | 2/2001 | White | |
| 6,372,970 B1 | * | 4/2002 | Saunders et al. | 84/293 |
| 6,459,024 B1 | * | 10/2002 | Baker | 84/291 |

* cited by examiner

*Primary Examiner*—Shih-Yung Hsieh
(74) *Attorney, Agent, or Firm*—Brian T. Sattizahn; McNees Wallace & Nurick LLC

(57) ABSTRACT

A stringed instrument is provided wherein a generally thin soundboard is stretched across a frame, keeping the weight away from the soundboard area that needs to vibrate, without muffling the tone. In a preferred form, a neck, or neck extension, reaches substantially through the body of the instrument. A block is anchored to the neck in close proximity to where the neck enters the body. The soundboard is attached securely to this block. Near the opposite end, a floating block is fastened securely to the soundboard. The neck is cut to an effective length to push against the floating block and act as fulcrum. At least one rod is anchored to the neck near the end where the neck enters the body and an opposite, threaded, rod end is inserted through holes near the bottom of the floating block to receive threaded nuts. Tightening the nuts effectively shortens the rod length, pulling the floating block back towards the end where the neck enters the body. In this manner, the floating block acts as a lever, stretching the soundboard.

33 Claims, 5 Drawing Sheets

TENSION TOP GUITAR

FIELD OF THE INVENTION

The present invention relates generally to stringed instruments, and in particular to a stringed instrument soundboard and soundbox.

BACKGROUND OF THE INVENTION

Stringed instruments generally fall into two major categories: those with solid bodies requiring a magnetic pick-up mounted under the strings to amplify the strings vibrations, and those that achieve amplification through, a hollow resonating cavity. The present invention relates to the latter.

Stringed instruments are divided into three main parts: the hollow body; the neck, which holds the frets; and the head, which contains the tuning pegs.

The soundboard is a wooden piece mounted on the front of the body, used to amplify the instrument sound. One or more generally large holes cut into the soundboard enhances sound transmission. For example, guitars generally have a round hole which may or may not be centered, while violins have a f-shaped pair of holes. The face of the neck is called the fingerboard or fret board and is separated into sections by dividers called frets. The frets are comprised generally of metal pieces mounted such that when a string is pressed down onto the fret, the length of the vibrating string is effectively changed, thereby allowing for control of the pitch and articulation of the music being played.

At the top of the fret board between the neck and the head is the nut. The nut is generally grooved to accept the string as it passes onto the head portion to wind into the tuning peg. As the tuning peg is turned, tightening the string, the tension on the string increases making the string's pitch higher. Conversely, loosening the string, which decreases the tension, lowers the pitch.

A bridge is attached to the soundboard for anchoring the other end of the string. A thin hard piece embedded into the bridge is called the saddle. It is upon the saddle that the strings rest. As the strings vibrate, the vibrations pass through the saddle to the bridge and into the soundboard, causing the entire soundboard to vibrate. The body of the stringed instrument forms a hollow soundbox, thereby amplifying the vibrations of the soundboard.

The body of most stringed instruments has a narrowing or "waist" forming two widened areas on either side of the waist, called bouts. The neck connects to the upper bout and the bridge attaches to the lower bout. It is the size and shape of the body and the bouts that produces the tone of a given stringed instrument. In general, the lower bout accentuates lower tones and the upper bout accentuates higher tones.

The challenge in building a stringed instrument is that the soundboard must be light in weight and flexible enough to vibrate freely, yet strong enough to withstand the tension of the strings. If the soundboard is too heavy, it will produce a muffled tone, if it is too delicate, the instrument will not be durable. Most luthiers have been willing to sacrifice some clarity of tone to make a long lasting instrument.

Current practice utilizes bracing to add strength to the soundboard without dampening too much of the soundboard's vibration. Bracing plays a major role in determining the tone of a stringed instrument, as well as aiding in the efficient propagation of the vibrations through a large area of the soundboard. Scalloped bracing is a method wherein wood is selectively removed from predetermined areas of the braces. In this manner, the bracing of the soundboard is weakened enough to allow it to vibrate freely without being so weak so as to make it structurally unsound. In longitudinal cross-section, a scalloped brace is generally in the form of a suspension bridge. Scalloped bracing is generally suitable for medium gauge or lighter strings only.

A second form of current practice bracing is known as X-bracing, shown in FIG. 1.

With X-bracing, the two main braces 2 under the soundboard 4 run in an "X" from the upper bout 6 to the lower bout 8. Generally, the "X" crosses at a predetermined location between the sound hole 10 and the bridge not shown). There may be auxiliary bracing 12 other than the main X-bracing. In some stringed instruments, the location of the X crossing 14 is placed such that the bridge rests more or less directly on the main X-braces, known as high-X-bracing, advanced X-bracing, or pre-war bracing. In this manner, the bridge can transfer more of its vibration to the soundboard 4. High X-bracing is usually scalloped.

Attempts have been made at producing a relatively thin soundboard while maintaining adequate strength. For example, U.S. Pat. No. 5,379,444 to Borisoff is directed to a bridge device for a stringed musical instrument comprising a bridge plate mounted adjacent to a front surface of the body of the musical instrument, a plurality of saddles secured to the bridge plate, and a plurality of armatures pivotally secured to the bridge plate. The bridge plate is secured to a bridge mounting block located substantially interiorly of the guitar, extending through a hole cut into the soundboard without touching the soundboard. To further secure the bridge mounting block, a truss rod engages a neck block and the bridge mounting block. A turn buckle allows for variation in truss rod length. Rotating the turn buckle results in increased guitar body tension to. counter-act the increased tension of the strings. In this manner, the bridge plate is mounted to the stringed instrument independent of the soundboard.

U.S. Pat. No. 6,040,510 to Yaun is directed to tensioned, springs attached to hooks which are disposed within the soundbox of a stringed musical instrument. A wood block is affixed to the inside top surface of an upper sounding board directly under and substantially parallel to a saddle. Two conventional eye-hooks are screwed into the block. Two oppositely spaced bottom blocks are affixed to the inside bottom surface at the neck of the soundbox and one eye-hook is screwed into each of the bottom blocks. Two springs are tensionally displaced within the soundbox in a V-shaped configuration by attachment to the eye-hooks.

U.S. Pat. No. 5,058,479 to Shaw is directed to a collapsible guitar in which the interior of the body is reinforced by a combination of truss rods and an adjustable brace member to retain optimum alignment within the body itself and between the body and wing panels. A cable or wire runs diagonally from the lower edge of the inside wall rearward and upwardly to the forward end of downwardly directed channels permanently attached to the underside of the top panel and end wall.

Although current practice has produced acceptable results, what is needed are improved methods to stretch a thin soundboard across a frame, keeping the weight away from the area that needs to vibrate, without muffling the tone. The present invention fulfills this need and further provides related advantages.

BRIEF SUMMARY OF THE INVENTION

The present invention provides for a stringed instrument wherein a generally thin soundboard is stretched across a frame, keeping the weight away from the soundboard area that needs to vibrate, without muffling the tone. In a preferred form, a neck, or neck extension, reaches substantially through the body of the instrument. A block is anchored to the neck in close proximity to where the neck enters the body. The soundboard is attached securely to this block. Near the opposite end, a floating block is fastened securely to the soundboard. The neck is cut to an effective length to push against the floating block and act as fulcrum. At least one rod is anchored to the neck near the end where the neck enters the body and an opposite, threaded, rod end is inserted through holes near the bottom of the floating block to receive threaded nuts. Tightening the nuts effectively shortens the rod length, pulling the floating block back towards the end where the neck enters the body. In this manner, the floating block acts as a lever, stretching the soundboard.

In a second form, the neck extension and anchored block are omitted. Two floating blocks are fastened securely to the soundboard. A fulcrum block is cut to an effective length and fitted snugly between the two floating blocks near, but without contacting, the soundboard. At least one rod is passed through holes near the bottom of the floating blocks, the rod threaded at both ends to receive a nut. The length of the fulcrum block, and hence, the distance between the two floating blocks is such that when either or both nuts are tightened, the floating blocks are tilted slightly, stretching the soundboard and keeping the soundboard in tension.

One advantage of the present invention is that the sustained tone produced by the stringed instrument increases because of the increased tension on the soundboard, allowing the soundboard to vibrate more easily.

Another advantage is that the soundboard can be made thinner, with increased stiffness, producing enhanced vibration, and hence, louder, clearer tone, without increasing the weight of the instrument.

Yet another advantage of the present invention is that the tension placed on the soundboard prevents; without the need for bracing, soundboard cracking and warping associated with temperature and humidity changes.

Still another advantage is that the increased tension to the soundboard created by the present invention reduces the movement of the bridge, resulting in less variation in pitch and, allows the soundboard to vibrate more easily, thereby increasing the sustained tone.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

While the following exemplar describes what is commonly referred to as an acoustic guitar, it should be understood that the present invention is useful in any hollow-bodied stringed instrument, for example, but not limited to, a ukulele, violin, viola, bass, electrified acoustic instrument and the like.

Figure 1:
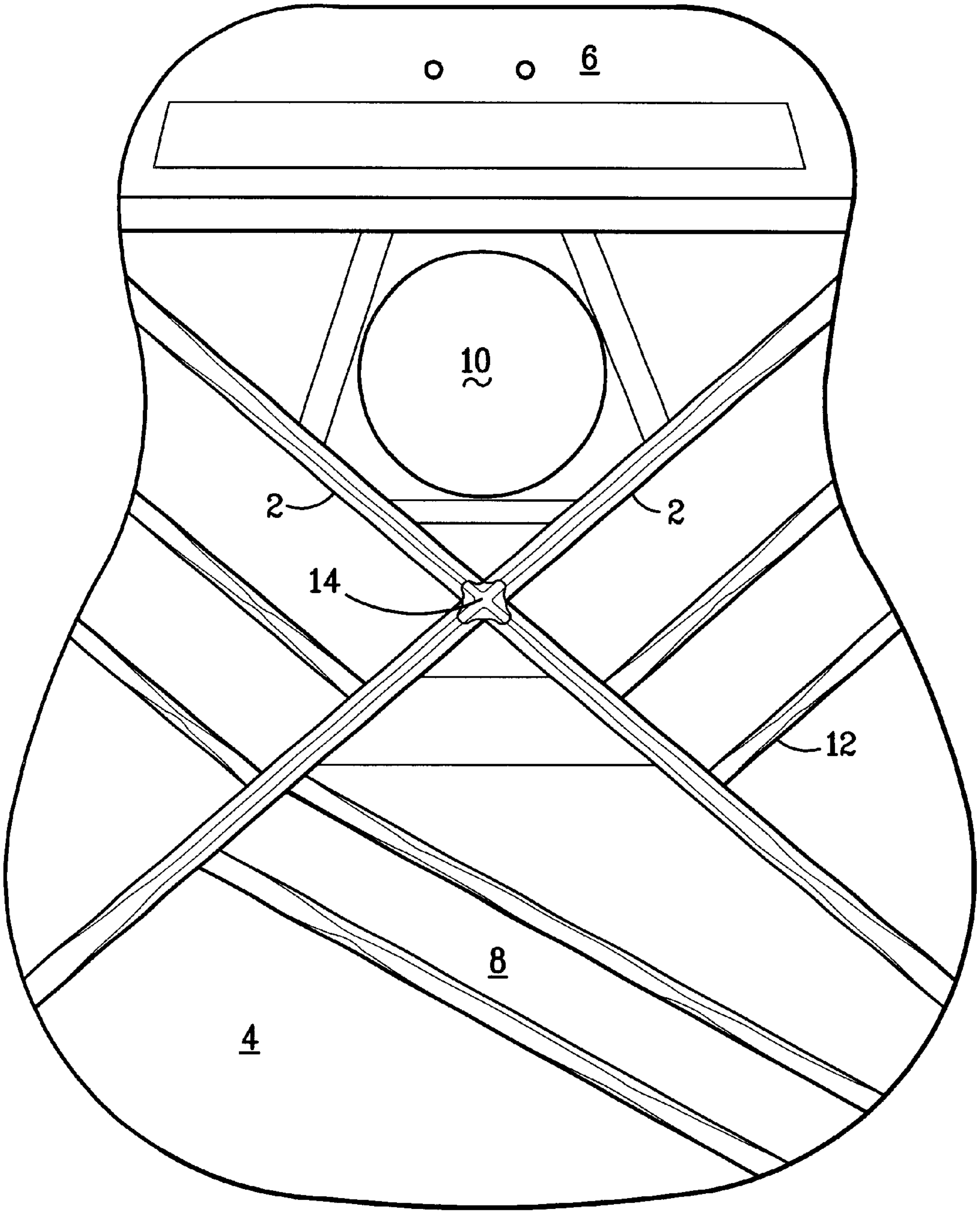
FIG. 1 Prior Art
FIG. 1 is a representation of current practice X-bracing.
Figure 2:
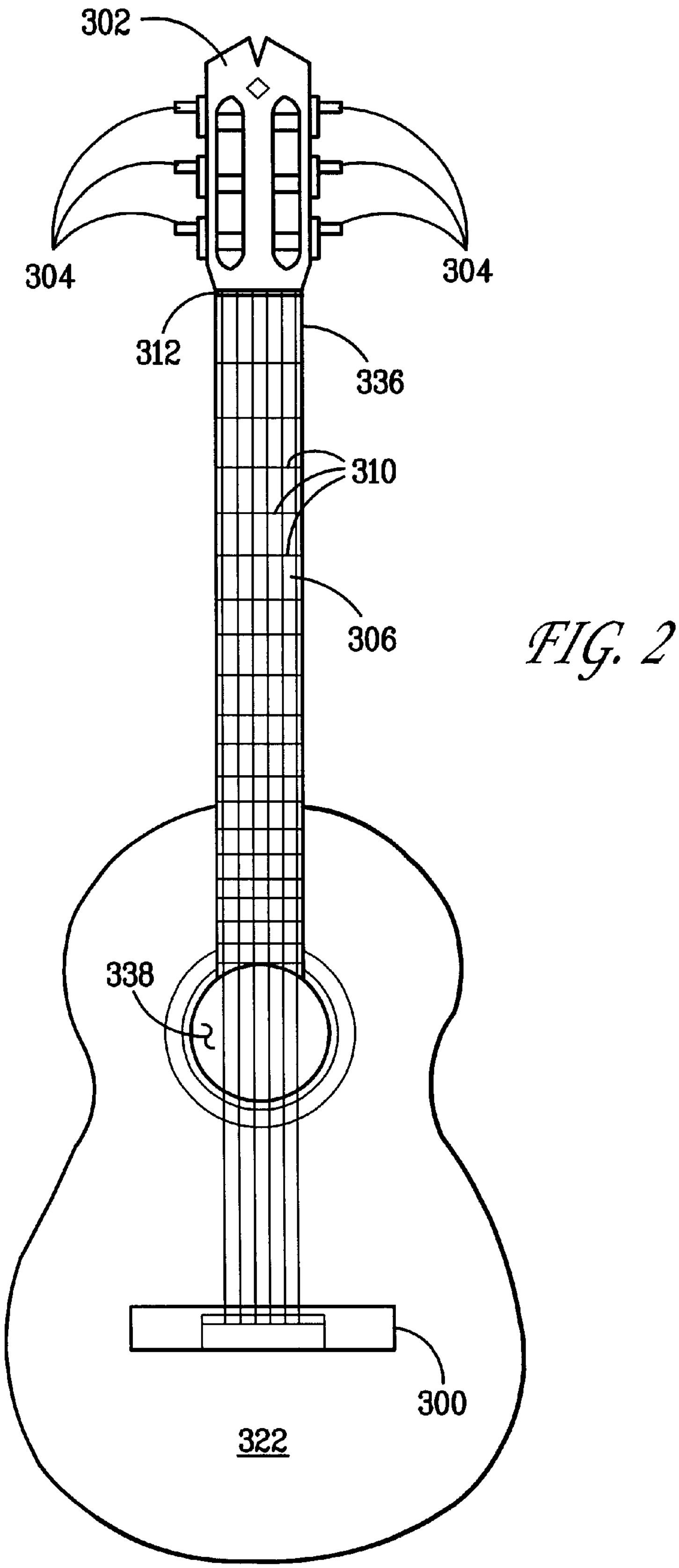
FIG. 2 is a top view of a guitar.
Figure 3:
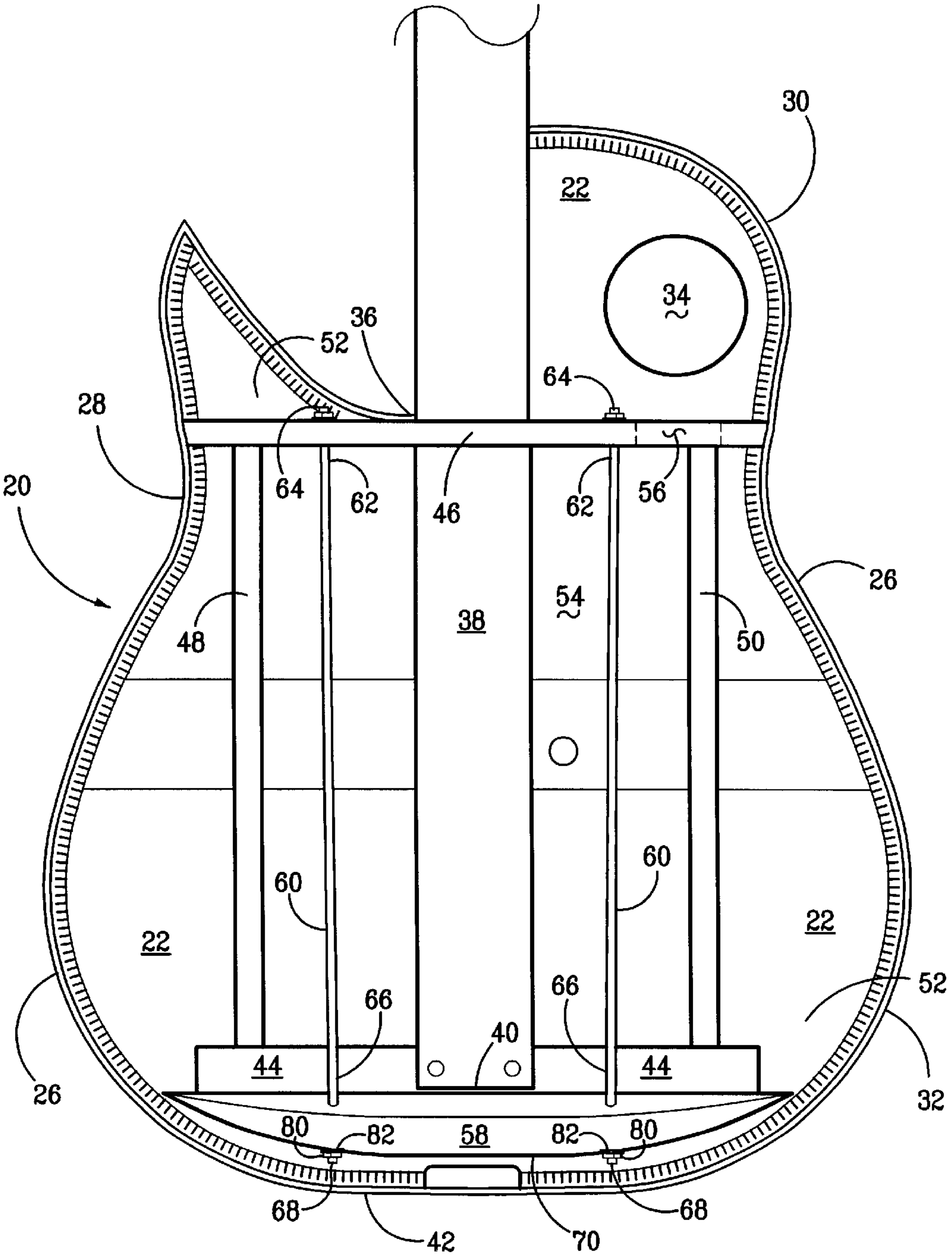
FIG. 3 is an frontal view of the interior of the soundbox of a first embodiment
Figure 4:
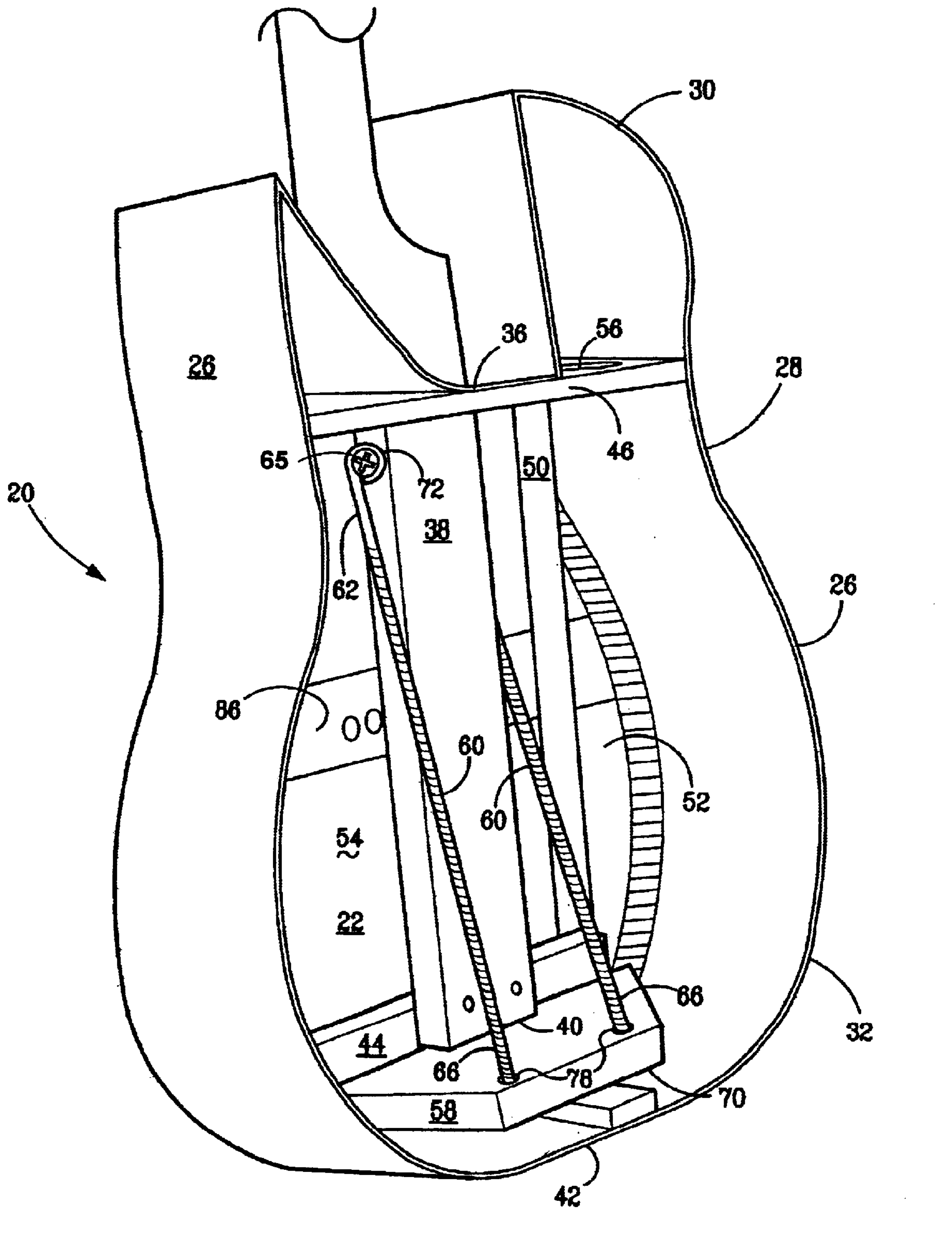
FIG. 4 is an oblique view of the interior of the soundbox of a first embodiment.
Figure 5:
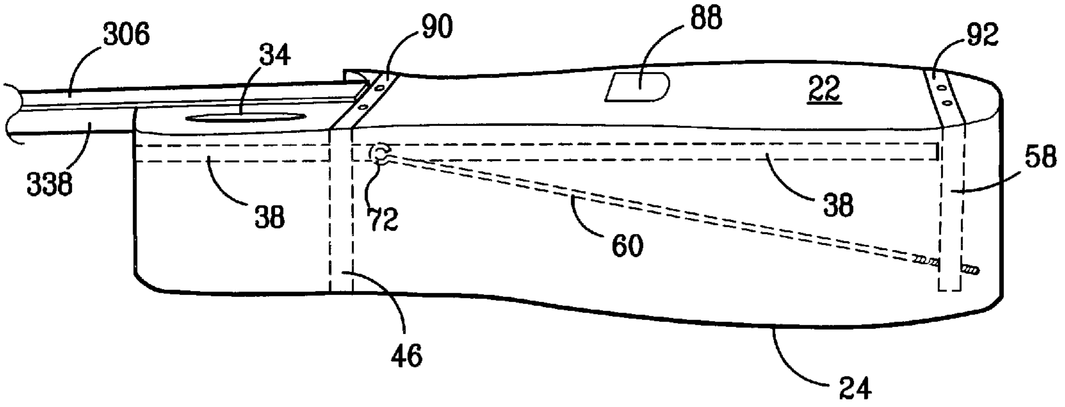
FIG. 5 is a side view of the interior of the soundbox of a first embodiment.

In FIG. 2, a guitar is shown with a bridge containing a bridge saddle 300 securely fastened to the outer surface of the soundboard 322, for example, with wood adhesive, as is well known in the art. Located at a neck end 336 is a head 302 with associated tuning pegs 304. The portion separating the sound hole 338 and the head 302 is called the fretboard 306, so named for the plurality of frets 310 contained therein. A nut 312 is fabricated into the fretboard 306 proximate to the head 302. Heads 302, tuning pegs 304, fretboards 306 and nuts 312 are well known in the art and will not be described in detail herein.

Referring to FIGS. 3 through 6, in a preferred embodiment, a guitar soundbox 20 comprises a face surface (referred to as the soundboard 22), a bottom surface 24 and a side surface 26. The side surface 26 is a predetermined height and is interposed between the soundboard 22 and bottom surface 24. The soundbox 20 is fabricated from materials that facilitate the transmission of vibrational energy. While materials such as plastics and metals may be used, generally, tonewoods are utilized, for example, spruce, cedar, redwood, koa, mahogany, rosewood, cocobolo, kingwood, morado, walnut and combinations thereof.

The soundbox 20, also referred to as the body, may take any shape, for-example, square, rectangular, triangular, trapezoidal, rhomboid, round, oval, or any free from shape, so long as it is hollow. The soundboard 22 and bottom 24 surfaces may be parallel, convex or concave to one another, as may be the side surface 26 to itself. In a preferred embodiment, the waist 28 forms an upper bout 30, generally smaller in volume than a lower bout 32. A sound hole 34 is cut into the soundboard 22 to facilitate transmission of sound energy from within the soundbox 26. Sound holes are well known, and may be in the form of, for example, round holes, oval holes, or a pair of f-shaped holes.

Entering the soundbox 20 at a soundbox neck end 36 is a neck extension 38. A terminal end 40 of the neck extension 38 is located a predetermined distance short of a soundbox bottom end 42, for example about ¼ inch to about 2 inches, preferably about ½ inch short of the soundbox bottom end 42. The neck extension 38 is positioned within the soundbox 20 so as to not contact the soundboard 22. Optionally, for increased support, the terminal end 40 of the neck extension 38 is fastened substantially perpendicular to a cross piece 44. Fastened in a substantially perpendicular manner between the cross piece 44 and a first mounting block 46 are first and second lengthwise pieces 48, 50. This optional frame formed by the cross piece and first and second lengthwise pieces 48, 50 is positioned so as to not contact the soundboard 22.

The first mounting block 46 is positioned within the soundbox 20 generally perpendicular to the neck extension 38 and preferably located proximate to the point the neck extension 38 enters the soundbox 20. The first mounting block 46 is sized to intimately contact the inner side 52 of the soundboard 22, bottom surface 24, side surface 26 and neck extension 38 and is affixed thereto, for example, with wood adhesive. When, as in FIG. 2, the design of the soundbox 20 is such that the sound hole 34 is separated from a main soundbox chamber 54, a supplemental hole 56 of a diameter sufficient to facilitate effective sound transfer between the main soundbox chamber 54 and the sound hole 34 is cut into the first mounting block 46.

A floating, second mounting block 58, also contained within the main soundbox chamber 54, is affixed, for example, with wood adhesive to only the soundboard inner side 52. The second mounting block 58 is positioned to cantilever over the terminal end 40 of the neck extension 38. Therefore, unlike the first mounting block 46, the second mounting block 58 is not intimately sized to contact the inner side of the bottom surface 24 or side surface 26. Rather, it is sized and positioned to provide effective mechanical advantage. when a compressive force is applied to the cantilevered end.

At least one adjustable member 60 is positioned within the soundbox 20 to apply this compressive force. A first end 62 is attached to a first attachment point 64, for example, the neck extension 38 proximate to where it enters the soundbox 20, preferably near the soundboard 22, and a second end 66 is attached to a second attachment point 68, for example, the second mounting block 58, preferably, near a bottom edge 70. As the length of the adjustable member 60 is varied, so too is the distance between a bottom edge of the first mounting block 46 and the bottom edge 70 of the second mounting block 58, thereby varying the tension placed on the soundboard 22. The adjustable member 60 varies this length, and therefore, the tension, by "rotating" the cantilevered second mounting block 58 around the neck extension terminal end 40 and "stretching" the soundboard 22.

As stated above, the neck extension terminal end 40 is located a predetermined distance short of a soundbox bottom end 42. This predetermined distance preferably should be a distance providing the best mechanical advantage for varying the soundboard tension, preferably, a distance which provides the maximum operable spacing between the first 46 and second 58 mounting blocks. The maximum operable spacing is defined to be the widest spacing that will permit the second mounting block 58 to rotate around the neck extension terminal end 40, placing tension on the soundboard 22.

In a preferred embodiment, the at least one adjustable member 60 comprises a rod having an eye 72 on a first end 62 and a threaded second end 66, for example, a 3⁄16 inch eyebolt. The eye 72 is fastened to the neck extension 38 with a fastener 65, for example, a screw or a bolt. The threaded second end 66 transverses a hole 78 in the second mounting block 58, the hole 78 preferably located proximate to the second mounting block 58 bottom edge, and secured with a nut 80, preferably a lock washer 82 and nut 80 Preferably two adjustable members 60 are used, one located on each side of the neck extension 38, as shown in the figures. As the nut 80 is torqued, the distance between the first 46 and second 58 mounting blocks is shortened as the second mounting block 58 rotates around the neck extension terminal end 40, placing increased tension on the soundboard 22.

Figure 6:
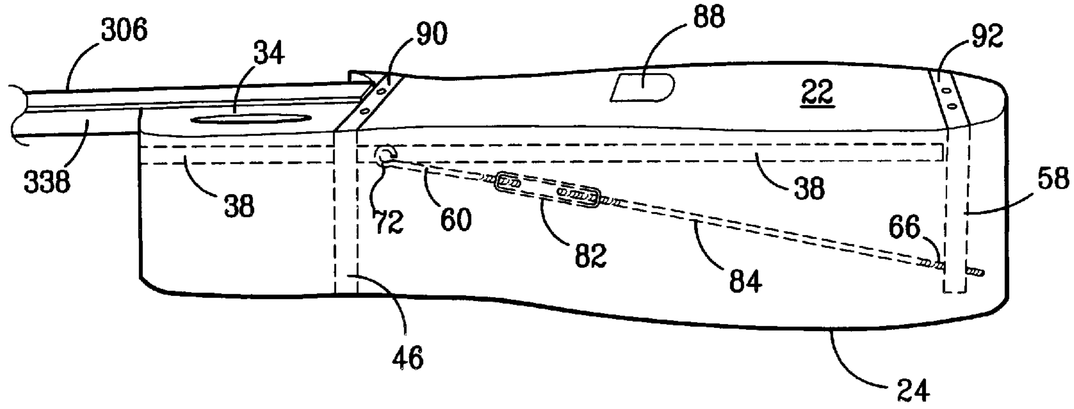
FIG. 6 is a side view of the interior of the soundbox with an additional adjustable member having a turnbuckle.

Referring to FIG. 6, alternatively, the at least one adjustable member 60 is, for example, an eyebolt of shortened length attached with a turnbuckle 82 to a second rod 84 threaded at both ends, fastened to the first and second attachment points 64, 68 as described above. As the turnbuckle 82 is torqued, the eyebolt 60 and rod 84 are drawn towards one another, shortening their combined length, thereby placing tension on the soundboard 22.

While in the preferred embodiment the first attachment point 64 is located on the neck extension 38, an alternative is to fasten the first end 62 of the adjustable member 60 to the first mounting block 46 in manner such as described above for attachment of the adjustable member 60 to the: second mounting block 58. The first attachment point 64 may be located anywhere along the width of the first mounting block 46, however, as with the second attachment point 68, locating the first attachment point 64 more proximate to the soundboard 22 provides increased mechanical advantage for rotating the second mounting block 58 about the neck extension terminal end 40.

In this manner, the soundboard 22 is strengthened through applied tension, rather than by braces glued to its underside. With the exception of an optional cross brace 86 (FIG. 4) adhered, for example, with wood glue, to the underside of the soundboard 22 beneath the bridge 88, there are no braces between the first 46 and second 58 mounting blocks.

Optionally, to provide further support, a first 90 and second 92 strip, for example, wood strips, spanning. the width of the soundboard 22, are fastened to the outer surface of the soundboard 22 overlying the first 46 and second 58 mounting blocks, for example, with screws through the soundboard 22 top into the first 46 and second 58 mounting blocks.

Figure 7:
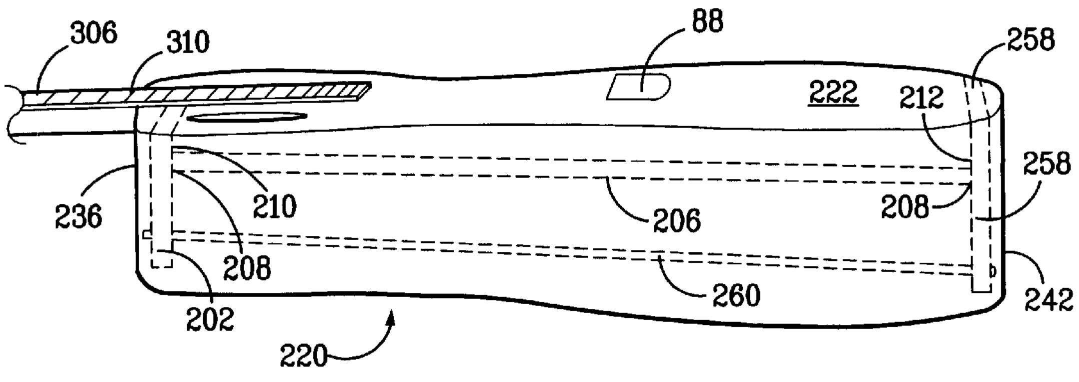
FIG. 7 is a side view of the interior of the soundbox of a second embodiment.

Referring to FIG. 7, in a second, different embodiment, a first floating mounting block 202 and second floating mounting block 258 are attached to the underside of the soundboard 222 within the soundbox 220, proximate to the soundbox neck end 236 and soundbox bottom end 242, respectively, sized and adhered, as described above, for floating, second mounting block 58. At least one fulcrum block 206 is sized to an effective length to fit snugly between the first mounting block 202 and the second floating mounting block 258. The fulcrum block 206 is preferably located proximate to, but without contacting the soundboard 222 and is held in position by frictional forces alone. It is located to provide the best mechanical advantage for the at least one adjustable member 260 fastened to the first and second floating mounting blocks 202, 258 to rotate, as described above, the first and second mounting blocks 202, 258 around the terminal ends 208 of the fulcrum block 206. The fulcrum block 206 helps to prevent bowing of the soundboard 222 upon application of tension by the at least one adjustable member 260.

In this manner, decreasing the length of the at least one adjustable member 260, as for example, described above, allows the first 202 and second 258 floating mounting blocks to rotate around the fulcrum block 206 at a first 210 and second 212 fulcrum point, respectively, thereby placing tensional forces on the soundboard 222. Optionally, a first adjustable member and a second adjustable member are used, separated by a distance that will effectively produce even tension to the soundboard 222. An optional cross brace is adhered, for example, with wood glue, to the underside of the soundboard beneath the bridge.

In both of the preferred embodiments described above, one or both of the mounting blocks may be angled such that the mounting block width (the distance measured from the soundboard to the bottom edge) may be wider on a base producing side of the soundbox than on a treble producing side of the soundbox. While supplemental bracing, for example, x-bracing, is not required for structural integrity, such supplemental bracing optionally may be added to soundboard bottom side to achieve a desired tonal effect.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A sounding board system for a string instrument comprising:

a face member having a top side; bottom side; neck end and opposing bottom end;

a bottom member having a top side; bottom side; neck end and opposing bottom end;

a side member of predetermined height interposed between the face member and bottom member so as to comprise a soundbox, the soundbox receiving a neck extension at a soundbox neck end, the neck extension out of contact with the face member and having a terminal end located a predetermined distance short of a soundbox bottom end;

a first mounting block disposed within the soundbox and attached to the face member bottom side, side member, bottom member top side and neck extension;

a second mounting block disposed within the soundbox attached to the face member bottom side and positioned to cantilever over the terminal end of the neck extension; and at least one adjustable member having a first end attached to a first attachment point and a second end attached to a second attachment point for varying the distance between a bottom edge of the first mounting block and a bottom edge of the second mounting block.

2. The sounding board system of claim 1 further including at least one sound hole communicating with the soundbox.

3. The sounding board system of claim 2 wherein the at least one sound hole is located on the face member.

4. The sounding board system of claim 2 wherein the at least one sound hole is substantially circular in shape.

5. The sounding board system of claim 2 wherein the at least one sound hole is substantially f-shaped.

6. The sounding board system of claim 2 wherein the at least one sound hole communicates with the soundbox through at least one supplemental hole sized to effectively facilitate sound transfer.

7. The sounding board system of claim 1 wherein the first attachment point is the neck extension.

8. The sounding board system of claim 1 wherein the first attachment point is the first mounting block.

9. The sounding board system of claim 1 wherein the second attachment point is the second mounting block.

10. The sounding board system of claim 1 wherein the first attachment point and second attachment point are positioned to provide effective mechanical advantage for rotating the second mounting block about the neck extension terminal end.

11. The sounding board system of claim 10 wherein the first attachment point is the neck extension proximate to the soundbox neck end and the second attachment point is proximate to a second mounting block bottom edge.

12. The sounding board system of claim 1 wherein the neck extension terminal end is positioned to provide the maximum operable spacing between the first and second mounting blocks.

13. The sounding board system of claim 1 further including a supporting frame, the frame out of contact with the face member and comprising a cross piece fastened substantially perpendicular to the neck extension terminal end and a plurality of lengthwise pieces, the lengthwise pieces each fastened substantially perpendicular to the cross piece and the first mounting block.

14. The sounding board system of claim 1 wherein the at least one adjustable member comprises an eyebolt having a non-threaded first end attached to the neck extension and a threaded second end passed through a hole in the second mounting block to threadably receive a nut.

15. The sounding board system of claim 14 wherein the eyebolt first end is attached to the neck extension proximate to the face member where the neck extension enters the soundbox and the hole in the second mounting block is proximate the second mounting block bottom edge.

16. The sounding board system of claim 14 wherein the eyebolt comprises a first half and a second half connected by a turnbuckle.

17. The sounding board system of claim 1 wherein the at least one adjustable member includes a first adjustable member and a second adjustable member separated by the neck extension.

18. The sounding board system of claim 1 further including a first and second strip mounted to the face member top side over the first and second mounting block, respectively, such that at least one fastener passed through the strip engages the respective mounting block.

19. The sounding board system of claim 1 further including a cross brace adhered to the bottom side of the face member beneath a bridge.

20. The sounding board system of claim 1 wherein at least one of the first and second mounting blocks are angled such that it is wider on a soundbox bass side than on a soundbox treble side.

21. The sounding board system of claim 1 further including supplemental bracing adhered to the face member bottom side.

22. A sounding board system for a string instrument comprising:

a face member having a top side; bottom side; neck end and opposing bottom end;

a bottom member having a top side; bottom side; neck end and opposing bottom end;

a side member of predetermined height interposed between the face member and bottom member so as to comprise a soundbox;

a first and second mounting block contained within the soundbox, the first mounting block proximate to a soundbox neck end, the second mounting block proximate to a soundbox bottom end, each mounting block fixed only to the face member bottom side;

a fulcrum block intimately fitted between the first and second mounting blocks, out of contact with the face member bottom side such that the first and second mounting blocks pivot around the fulcrum block when a tension force is applied to the first and second mounting blocks, the tension force producing tension to the face member; and at least one adjustable member having a first end attached to the first mounting block and a second end attached to the second mounting block for varying the distance between a bottom edge of the first mounting block and a bottom edge of the second mounting block, thereby providing the tension force.

23. The sounding board system of claim 22 further including at least one sound hole communicating with the soundbox.

24. The sounding board system of claim 22 wherein the at least one adjustable member comprises a first threaded rod and a second threaded rod connected by a turnbuckle, each threaded rod having a terminal end such that the terminal end transverses the first mounting block and second mounting block, each to receive a nut.

25. The sounding board system of claim 22 wherein the at least one adjustable member includes a first adjustable member and a second adjustable member separated by a distance to effectively produce even tension to the face member.

26. The sounding board system of claim 22 further including a first and second strip mounted to the face member top side over the first and second mounting block, respectively, such that at least one fastener passed through the strip engages the respective mounting block.

27. The sounding board system of claim 22 further including a cross brace adhered to the bottom side of the face member beneath a bridge.

28. The sounding board system of claim 22 wherein at least one of the first and second mounting blocks are angled such that it is wider on a soundbox bass side than on a soundbox treble side.

29. The sounding board system of claim 22 further including supplemental bracing adhered to the face member bottom side.

30. A string instrument including the sounding board system of claim 1.

31. A string instrument including the sounding board system of claim 22.

32. A method of applying tension to a soundboard comprising:

affixing a first mounting block to a soundboard bottom member;

inserting a fulcrum block between the, first and second mounting blocks such that at least one of the blocks is rotatable affixing a second mounting block proximate to but not attached the guitar bottom sidewall about the fulcrum block upon application of a first tensioning force; and applying the first tensioning force such that a second tensioning force is transmitted to the soundboard.

33. The method of claim 32 wherein the fulcrum block is a neck extension.

* * * * *

UNITED STATES PATENT AND TRADEMARK OFFICE

CERTIFICATE OF CORRECTION

PATENT NO. : 6,646,191 B1
DATED : November 11, 2003
INVENTOR(S) : E. Cleason Martin It is certified that error appears in the above-identified patent and that said Letters Patent is hereby corrected as shown below:

Column 10,
Lines 5-16, reads "32. A method of applying tension to a soundboard comprising: affixing a first mounting block to a soundboard bottom member; inserting a fulcrum block between the, first and second mounting blocks such that at least one of the blocks is rotatable affixing a second mounting block proximate to but not attached the guitar bottom sidewall about the fulcrum block upon application of a first tensioning force; and applying the first tensioning force such that a second tensioning force is transmitted to the soundboard." should read
-- 32. A method of applying tension to a soundboard comprising: affixing a second mounting block to a soundboard bottom member; affixing a first mounting block proximate to but not attached to the soundboard bottom member; inserting a fulcrum block between the first and second mounting blocks such that at least one of the blocks is rotatable about the fulcrum block upon application of a first tensioning force; and applying the first tensioning force such that a second tensioning force is transmitted to the soundboard. --

Signed and Sealed this

Sixteenth Day of March, 2004

JON W. DUDAS
*Acting Director of the United States Patent and Trademark Office*